(12) United States Patent
Stone

(10) Patent No.: US 7,770,419 B2
(45) Date of Patent: Aug. 10, 2010

(54) PUBLIC AND PRIVATE USE LOCKABLE BICYCLE RACK HANGER FOR FRAME AND TIRES

(76) Inventor: George Ward Stone, 640 W. Briar Pl., Unit 220, Chicago, IL (US) 60657

( * ) Notice: Subject to any disclaimer, the term of this patent is extended or adjusted under 35 U.S.C. 154(b) by 0 days.

(21) Appl. No.: 11/318,307

(22) Filed: Dec. 23, 2005

(65) Prior Publication Data

US 2007/0144223 A1  Jun. 28, 2007

(51) Int. Cl.
*E05B 71/00* (2006.01)
(52) U.S. Cl. .................. 70/2; 70/18; 70/58; 70/233; 70/235; 211/5; 292/281
(58) Field of Classification Search ........... 70/233–236, 70/62, 2–13, 18, 19, 58; 211/5, 4; 292/281, 292/282; 16/333, 343; 224/935; 410/7; 248/551–553
See application file for complete search history.

(56) References Cited

U.S. PATENT DOCUMENTS

| | | | | |
|---|---|---|---|---|
| 639,517 | A | * | 12/1899 | Butcher .......................... 211/5 |
| 754,483 | A | * | 3/1904 | Mustgrove .................. 248/552 |
| 1,326,688 | A | * | 12/1919 | Perry ............................. 70/18 |
| 1,449,913 | A | * | 3/1923 | Russell ........................... 70/18 |
| 3,739,609 | A | * | 6/1973 | Kaufmann .................... 70/234 |
| 3,783,659 | A | | 1/1974 | Rossi |
| 3,817,064 | A | * | 6/1974 | Sallee ............................ 70/58 |
| 3,865,246 | A | * | 2/1975 | Lieb et al. ...................... 211/5 |
| 3,934,436 | A | * | 1/1976 | Candlin et al. ................ 70/234 |
| 3,942,646 | A | | 3/1976 | Nelson et al. |
| 3,944,079 | A | * | 3/1976 | Boslough ........................ 211/5 |
| 3,964,611 | A | | 6/1976 | Galen et al. |
| 3,970,196 | A | * | 7/1976 | Legge ............................ 211/5 |
| 4,126,228 | A | | 11/1978 | Bala et al. |
| 4,248,399 | A | * | 2/1981 | Gipson ........................ 248/552 |
| D301,217 | S | | 5/1989 | Mailhot et al. |
| 4,932,693 | A | * | 6/1990 | Schwartz ..................... 292/205 |
| 5,025,932 | A | | 6/1991 | Jay |
| 5,096,068 | A | | 3/1992 | Theriault |
| 5,244,101 | A | | 9/1993 | Palmer et al. |
| 5,323,915 | A | * | 6/1994 | Fortune et al. ................. 211/5 |
| 5,472,101 | A | * | 12/1995 | Ahrens ...................... 211/70.5 |
| D367,022 | S | | 2/1996 | Graber |
| 5,524,772 | A | * | 6/1996 | Simmons ........................ 211/4 |
| 5,553,715 | A | | 9/1996 | Brotz |
| 5,642,635 | A | * | 7/1997 | Wen-Chyun .................... 70/46 |
| 5,678,435 | A | * | 10/1997 | Hodson ........................ 70/233 |

(Continued)

*Primary Examiner*—Lloyd A Gall
(74) *Attorney, Agent, or Firm*—McCraken & Frank LLP

(57) ABSTRACT

An improved bicycle rack for public and private use having a hanger housing frame (10), having a hinged door extending from the upper portion of the housing, connected with a hinge assembly (13). Extending from the lower frame end is a seats section, (26), (27), (28), (29), allowing the placing a bicycle frame and one or two bicycle tires. A flange (18) protrudes through a flange cutout (20) when the door (17) is closed. The flange (18) has a primary shackle cutout (19) providing for the locking of the chamber opening (16), no longer requiring the use of u-shape, tether locks, (although they may be used) a simple key or combination lock is all that is required to lock the frame and released tires within an approximately 9"×9" chamber (25). The hanger housing mounting surface (24) is intended to be welded or otherwise affixed to parking meters, stationary objects, and other similar structures.

22 Claims, 4 Drawing Sheets

U.S. PATENT DOCUMENTS

| | | |
|---|---|---|
| 5,706,679 A | 1/1998 | Zane et al. |
| 5,743,411 A | 4/1998 | Hawkes |
| 5,887,461 A * | 3/1999 | Heffley .................. 70/18 |
| D408,764 S | 4/1999 | Graber |
| D409,118 S | 5/1999 | Graber |
| D409,134 S | 5/1999 | Will |
| 6,164,097 A * | 12/2000 | McBryde .................. 70/58 |
| 6,223,907 B1 | 5/2001 | Graber |
| D447,723 S | 9/2001 | Spangler |
| D448,567 S | 10/2001 | Buss |
| D480,025 S | 9/2003 | Denney |
| 6,751,992 B1 * | 6/2004 | Esquilin .................. 70/233 |
| 7,086,255 B2 * | 8/2006 | Reason .................. 70/2 |

* cited by examiner

PUBLIC AND PRIVATE USE LOCKABLE BICYCLE RACK HANGER FOR FRAME AND TIRES

FIELD OF THE INVENTION

The present invention relates to a public and private use bicycle rack, particularly related to the ability to hang a bicycle frame and two bicycle tires conveniently within an approximately 9"×9" chamber and, if so desired, lock one, two, or all three bicycle parts within the chamber, without the use of u-shape or tether locks, subsequently providing intended benefits for cyclists, municipalities and bicycle manufacturers as well.

BACKGROUND OF THE INVENTION

Bicycles

Bicycle manufacturers have witnessed a recent resurgence of bicycle purchases. The interest in bicycles presumably has stemmed from increases in costs of gasoline, the health benefits of cycling and recreational endeavors for the individual or family.

A myriad of bicycle designs such as quick release tires, lightweight aluminum framesets of varying sizes and geometric configurations, as well as multi-speed gearing mechanisms which eases the traversing of divergent terrain along bicycle trails, have emerged. Prior to the advent of quick release tires a cyclist had to transport an open-end adjustable wrench or small toolbox to remove fastening nuts securing the tire axle to the fork to repair a flat. Today, all that has to be done is to flip a lever with a finger allowing the loosening of the bicycle fork nuts by hand, no longer requiring a wrench to repair a flat. Since tires are so easily removed, consideration on how best to prevent their theft and how easily and conveniently it is accomplished, has been the primary motivation behind the novel embodiments of the present invention herein presented.

Bicycle Locks

A diverse array of locks is made available for the cyclist to use while parking and locking a bicycle to immovable objects to deter theft while in public. Anything a u-shape, tether or chain is able to wrap around becomes a bicycle rack. These locks comprise u-shape, tether, chains and handcuff style locks. They are able to traverse about trees, fences, parking meters, signage posts or bicycle racks municipalities are making available and installing along sidewalks, or wherever it is deemed appropriate or a convenience for cyclists. The present invention eliminates the need to remove a front tire to secure both the bicycle and the tire to a rack.

Municipalities

Municipalities, in an effort to make available locking stanchions for cyclists, have installed inverted u-shape style bicycle racks to enable a cyclist to lock his/her bicycle. Inverted u-shape bicycle racks being installed by municipalities provide no more features for parking or locking a bicycle than a tree, fence or light pole. It seems these bicycle racks are designed to accommodate the special lock rather than providing a comprehensive, easily used, convenient, less cumbersome means to lock a bicycle while in public.

Multi-station bicycle racks seen on school grounds, university campuses, libraries and commuter train stations prevent the bicycle from falling to the ground merely by the fact the bicycle falls against the adjacent stanchion. Usually the front tire is rolled between two arched metal tubes, one leans the frame, or side of the tire, or both against the metal tube. Then a u-shape, chain or tether lock is wrapped around the front tire, around the frame, around the racks tube and the lock or locks are secured. With a single stanchion bicycle rack, the same cumbersome process must be performed, but because there are no adjacent posts or means to support the frame or the bicycle, although locked with u-shape and or tether locks, bicycles tend to fall to the ground.

PRIOR ART

With in the bicycle rack manufacturing community it is presumed a bicycle rack design must provide a rail or side to lean the bicycle against, (to prevent it from falling), and that it must be able to accommodate a u-shape lock are the main criteria for a preferred design. There are vast differences between that concept, and what the present invention provides. On the contrary, the present invention does not require a side to lean the bicycle against, nor does it require a u-shape or tether lock to lock all three members of the bicycle, therefore presenting a different approach and novel solutions to existing problems or locking inconveniences.

The present inventions' novel embodiments differ greatly from what the bicycle rack manufacturers say and suggest should comprise a bicycle rack, yet yield numerous advantages for the cyclist burdened with the task of locking a bicycle frame and removable tires.

The bicycling community would be better served if the following features were made available on bicycle racks to provide a less cumbersome, more advantageous process to lock and park a bicycle while in public.

1. Instead of leaning a bicycle frame against a pole, if a bicycle rack enabled the placing of the frame on a hanger or shelf, this process would minimize marring of its' finish, and prevent the bike from falling.
2. Rather than requiring u-shape, tether, chain and handcuff style locks which necessitates the placing about and through various bike parts to lock a bike, it would be an advantageous feature to be able to lock a frame, front and rear tires with a small common household key or combination lock.
3. It would be accommodating, less cumbersome, easily performed if a bike rack didn't necessitate the placing of the removed tire or tires upon the ground if they were removed, in order to lock the various parts.
4. For municipalities and pedestrians a bike rack consuming approximately 9"×9" of area could be attached to existing municipal parking meters and the like, sidewalk congestion and consumption of sidewalk space would be greatly reduced, and when not in use would not clutter pedestrian walkways.
5. A bike rack not requiring surface mounting, or embedded installation reduces pedestrian hazards along a walkway.
6. Bike racks allowing three hundred sixty degree placement of a bike frame against its structure, inadvertently permits the bike to protrude into pedestrian passageways.
7. Bicycle racks not requiring the need for specialty locks and their placement around and through various parts will reduce the damage to the finish of the bike.
8. If a bicycle rack providing these unique features could also be welded to existing bicycle racks the cyclist and municipalities would benefit from the novel feature of the novel design presents.

9. The proposed bicycle rack will enable the various locking scenarios of just the frame, the frame and front tire or the frame and both tires.
10. For those locations where pedestrian traffic is not a concern, a single stanchion and multi-stanchion arrangement of the proposed bicycle rack will be made available, providing the unique features and capabilities herein listed.

BRIEF SUMMARY OF THE INVENTION

The public and private use lockable bicycle rack hanger for frame and tires allows for the locking of frame and both tires with a common household key or combination lock. This is accomplished by placing a bicycle frame within the chamber, removing either one or both tires, place them within the chamber, close the door and lock all three without the use of u-shape or tether locks. Welding the invention to existing bicycle racks and parking meters will provide municipalities and cyclist the features the invention provides.

The resulting novel and useful features of the present invention would enable the cyclist to enjoy the benefit from the following comprehensive features:

1) to prevent a bicycle from falling to the ground and or hanging of the bicycle specialty locks
2) no longer requiring the placing of the fork of the front tire upon the ground when the quick release tire has been removed
3) to use a common household lock to lock the present inventions chamber containing frame and both tires
4) to place the bicycle along the preferred and intended parking plane rather than inadvertently placing a bicycle within a sidewalk passageway.
5) to hang both bicycle tires and frame within the inventions hanger chamber.
6) although the present invention does not require special locks to lock the bicycle and tire, they still may be used to insert into the primary locking loophole.
7) when the present invention becomes commonplace, will no longer require the cyclist mount u-shape or tether locks on the bicycle frame for transporting while cycling in an urban neighborhood.
8) the hanger seats within the invention will be covered with a "snap-on snap-out" protective plastic or rubber cushion, to assist in preventing marring of the finish of the bicycle while placed within the chamber of the present invention The resulting novel and useful features of the present invention will enable municipalities to benefit from the following.

Municipalities would be able to:
1) provide a more functional bicycle rack for the cycling community.
2) attach the present invention to existing parking meters, light poles, signage, and for that matter already installed prior art bicycle racks, to provide the novel features and benefits the present invention provides.
3) minimize sidewalk space now consumed by prior art bicycle racks by welding the present invention to existing parking meters and the like.
4) place or install the present invention in such a fashion to regulate in which direction the bicycle may be positioned while parked and locked, reducing the possibility of inadvertent placing of the bicycle within pedestrian passageways, reducing hazards, unsightliness and resulting congestion.

5) from what can be presently determined, the present invention should cost significantly less to purchase relative to prior art.
6) select from various installation methods, although the present invention is best utilized (best mode) as an attachment to existing parking meters, light poles, signage and already installed prior art bicycle racks.

Other installation methods and configurations available for the present invention are embedded, surface mounting, wall mounting, single, dual and multi-unit bicycle racks.

Considering the fact that there are a multitude of bicycle frameset heights, geometric configurations and material widths that make up models and styles being produced the present inventions hanger seat surface distance from the ground will be approximately 28 to 30 inches. The determining factor, what the bicycle industry calls the "top tube" or upper member of the bicycle frame, is placed within the present inventions housing and atop the hanger seats.

To enable the placement of a bicycle framesets' "top tube", of lesser height bicycles within the present inventions chamber, the cyclist merely lifts the front of the bicycle upwards and places the "top tube" onto the present inventions bicycle frame seat. Then proceeds to remove the quick disconnect tire, slides adjacent spokes between the tire spoke slip and places the tire rim on the tire rim seat, closes the hanger housing door, places a common household lock of choice through a flange cutout, locking the tires and frame within the present inventions chamber.

A unique hinge designed has been introduced on the present invention to prevent removal of the hinge pin. Common hinges, known to all of us, enable the pin to be removed, such as an interior household door. But for public access use, such as the present invention, the hinge assembly is designed with an inaccessible encapsulated hinge pin to prevent disassembly, deterring disassembly and theft of items locked within the chamber. It is a "Zans" inaccessible, encapsulated hinge pin for public use chambered bicycle racks.

DETAILED DESCRIPTION OF THE INVENTION

Preferred Embodiments

Figure 1:
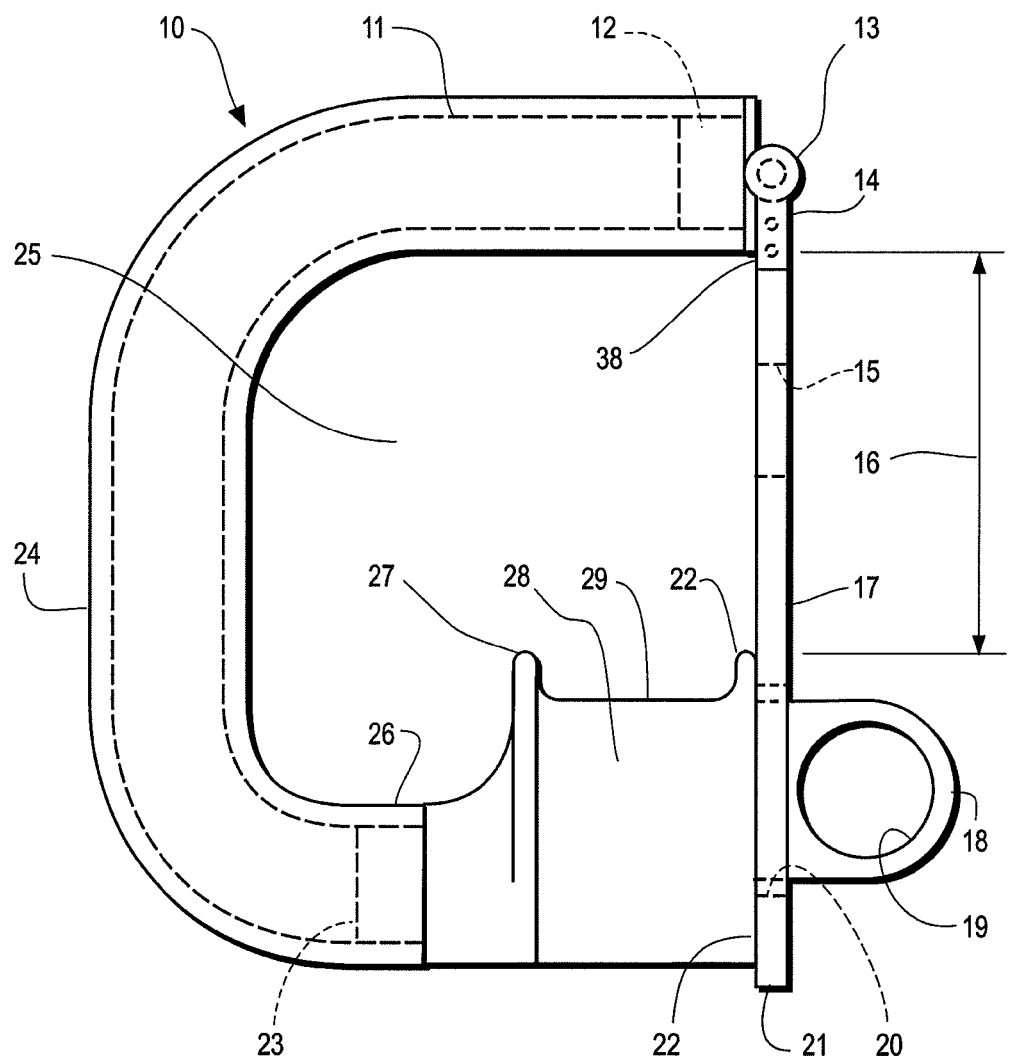
FIG. 1 is a side view elevation of the lock in accordance with an embodiment of the invention.

The following is descriptive nomenclature of the several embodiments, characteristics and features comprising the invention illustrated within the enclosed drawings:

(10) Hanger housing frame
(11) Frame inner-diameter lumen
(12) Upper extremity attaching end cap
(13) Hinge assembly
(14) Hinge end cap
(15) Secondary shackle cutout
(16) Chamber opening
(17) Door and lower hinge leaf portion
(18) Flange
(19) Primary Shackle cutout

(20) Flange cutout
(21) Door pull
(22) Doorstop
(23) Lower extremity attaching end cap
(24) Hanger housing frame mounting surface
(25) Chamber
(26) Bicycle frame seat
(27) Seats partition
(28) Spoke slip
(29) Tire rim seat
(30) Upper hinge leaf
(31A) Partially bored hinge knuckle/right side
(31B) Partially bored hinge knuckle/left side
(32) Hinge pin shaft
(33) Hinge cap alignment pins
(34) Hinge pin cap and shoulder
(35) Hinge pin
(36) Hinge pin alignment holes
(37A) Fully bored hinge knuckle lower hinge leaf
(37B) Fully bored hinge knuckle upper hinge leaf
(38) Door shelf cutout Now turning to the figures and drawings in which like references to like elements throughout the several views, various aspects and embodiment of the present invention are described.

The main structure of the present invention and preferred embodiment is illustrated in FIG. 1 and the hanger housing frame 10. The hanger housing frame 10 is manufactured from steel tubing formed into a "C" shaped arc resulting in the formation of the open chamber 25. Within the hanger housing frame inner-diameter lumen 11, the upper extremity end cap 12 and lower extremity end cap 23 are placed within and welded.

Figure 3:
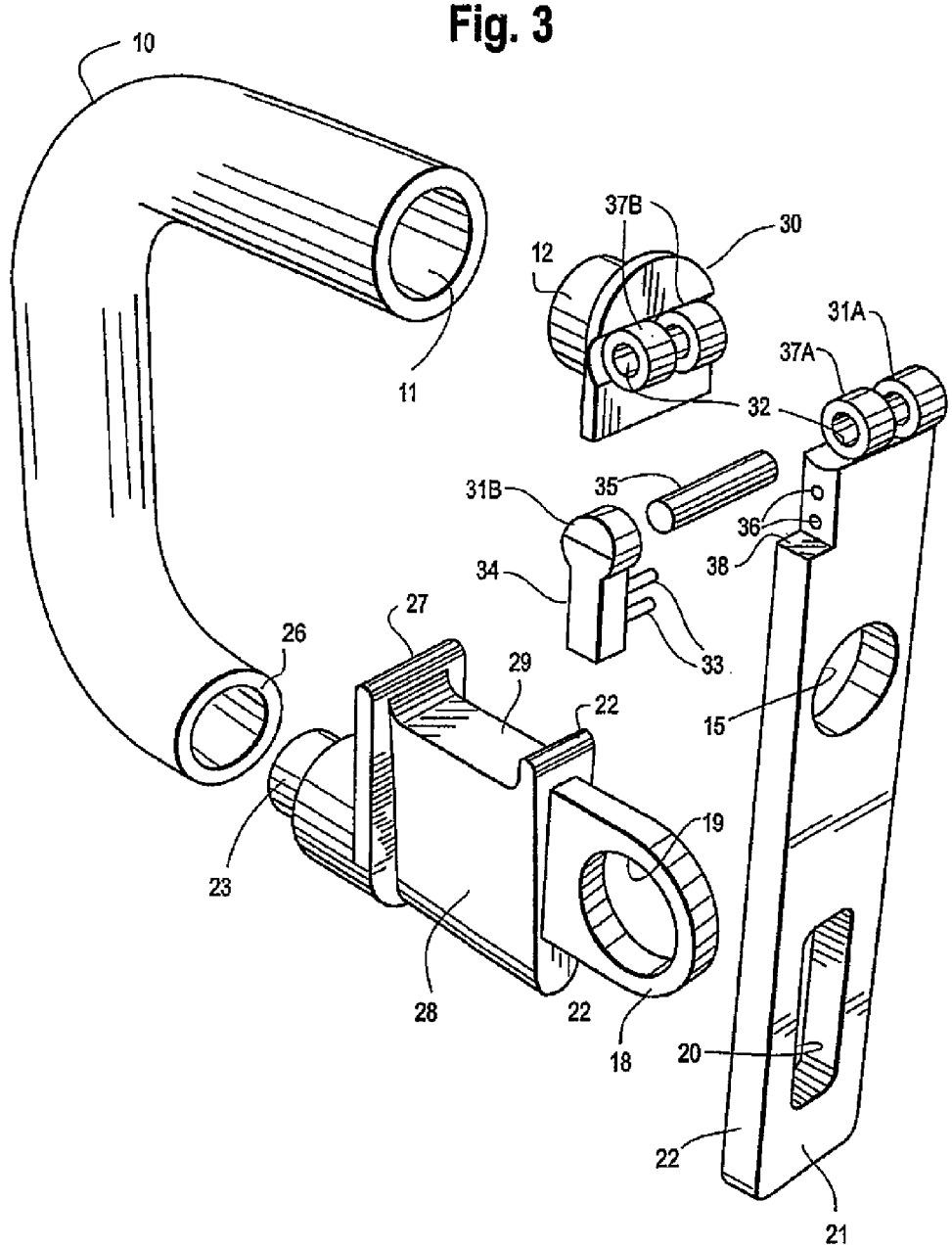
FIG. 3 is an exploded isometric view illustrating the various parts according to an embodiment of the invention.

An integral part of the upper extremity end cap (12) is the upper hinge leaf 30, FIG. 3, containing two upper hinge knuckles 37B, which are fully bored horizontally with a hinge pin shaft 32.

The door and lower portion hinge leaf 17, FIG. 1 is designed with a lower hinge knuckle 37A and is fully bored horizontally with a hinge pin shaft 32. Viewing the door 17, FIG. 1 (front view) the right positioned hinge knuckle 31A differs from the knuckle 37A, 31A is not fully bored, but is drilled approximately one-half the thickness horizontally through the knuckle forming a partial hinge pin shaft 32.

Comprising the hinge assembly 13, FIGS. 1 and 3 are a hinge pin cap and shoulder 34, also a knuckle designed with a half bored hinge pin shaft 32. The hinge pin 35, FIG. 3, after juxtaposition placement of the upper and lower hinge knuckles, is inserted within the hinge pin shaft 32. The hinge pin cap 34 is fitted with two hinge cap alignment pins 33 and placed on the door shelve cutout 38 to be inserted into two corresponding hinge pin alignment holes 36 and welded.

Viewing the hinge assembly FIG. 3, from left to right there are the elements 34,37B, 37A, 37B, 31A and a hinge pin 35 and related shaft 32 completing the hinge assembly, allowing for the arced traversing of the door 17 around the hinge pin, resulting in the opening and closing of the chamber opening 16, FIG. 1.

The lower extremity attaching end cap 23, FIGS. 1 and 3 extends horizontally from the hanger housing frame 10, and forming, in conjunction with the inner surface of the hanger housing frame 10, a bicycle frame seat 26 and is partitioned from other seats by a seats partition 27.

FIG. 1 illustrates the preferred embodiments 28, 29 and 22. These members further extend horizontally and outwardly from the seats partition 27. The tire rim seat 29 is the top surface of the spoke slip 28. The size of 29 will accommodate both released front and back tires. The doorstop 22 permits the door to rest against 22s' surface when the door is in the downward closed position.

FIG. 1 illustrates the flange 18 extending further horizontally from the doorstop 22, an integral part of the lower extremity attaching cap 23. The primary shackle cutout 19, a circular cutout is centered on the flange 18.

Figure 2:
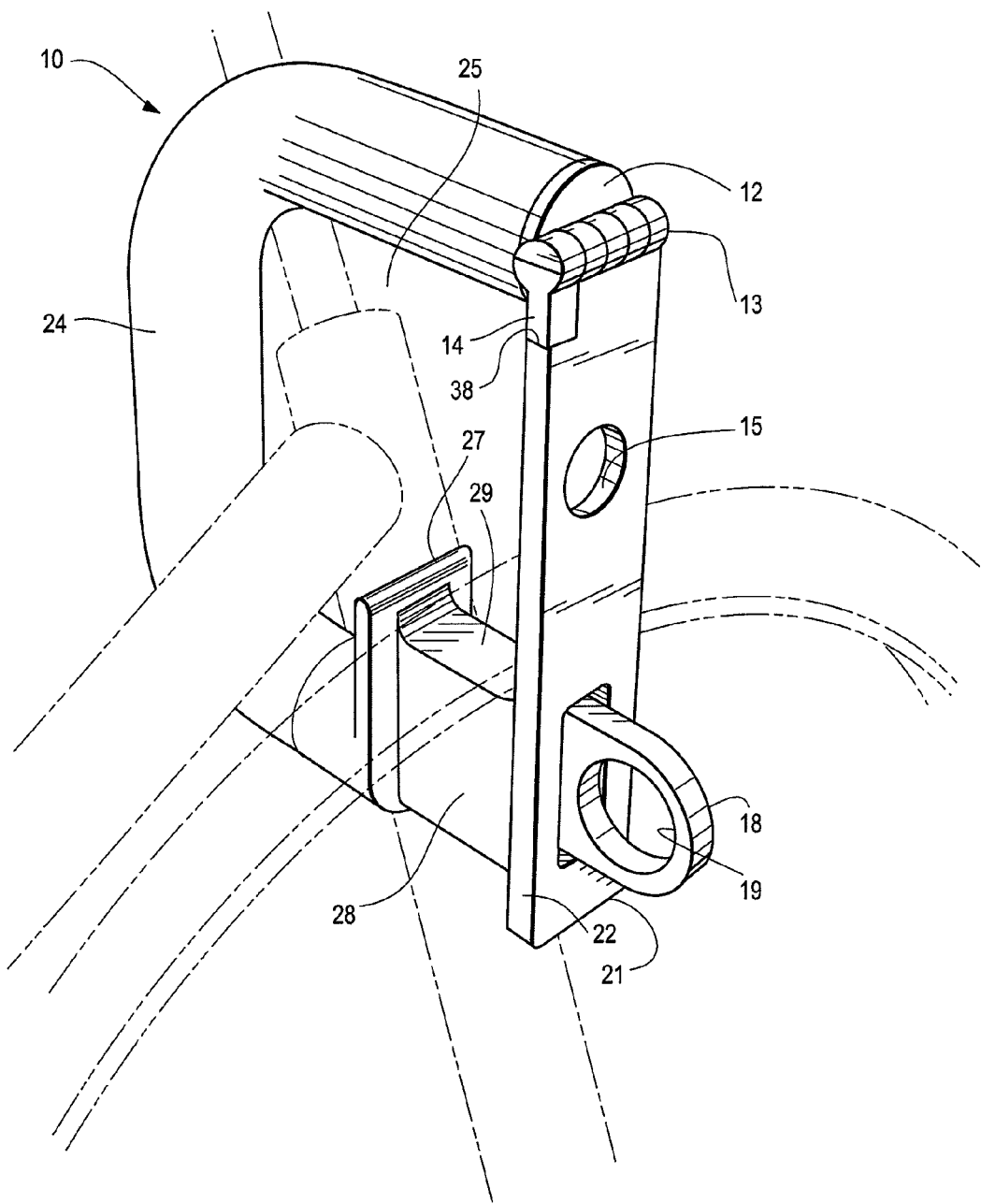
FIG. 2 is an isometric view of one embodiment of the assembled invention.

Illustrated in FIGS. 1, 2 and 3 is the flange cutout 20, a rectangular opening positioned to receive the flange 18, allowing the passage through 20 of the flange 18, when the door 17 is in the down and closed position against the doorstop 22.

In order to provide means for enabling for various locking scenarios a secondary shackle cutout 15 has been positioned on the door 17. The door pull 21, FIG. 1, is positioned at the lower extremity of the door 17, permitting the placing of a human finger to exact force upwards and downwards to open and close the door 17.

The hanger housing frame outer vertical surface 24 is an attaching surface for connecting the present invention to metal surfaces such as parking meters, poles, prior art bicycle racks and an add on accompanying bollard model, not shown.

In order to be able to protect the bicycle finish, the surface of 26, 27, 28 and 29 is covered by a snap-on, snap-off seat cushion (not shown), manufactured of plastic or rubber, or combination of appropriate materials.

DETAILED DESCRIPTION OF THE INVENTION

Operation

FIG. 1, the hanger housing frame 10 is connected to the upper extremity attaching cap 12 and lower extremity attaching cap 23 by welding these parts to the inner-diameter lumen. The hinge assembly 13 connects the door 17 and the door swings up and down to open and close the chamber opening 16.

The vertical hanger housing frame mounting surface 24, FIG. 1, would be welded to a receiving metal surface approximately (27" to 30") from the ground. In order for a person to lock his/her bicycle within the inventions' chamber 26, placing a finger on the door pull 21 would open the door 17, and the door 17 would traverse about the hinge assembly 13. Once the door is in the open position, the cyclist would place the top tube of his/her bicycle frame within the chamber 25 and atop the bicycle frame seat 26 by passing through the chamber opening 16.

Once this procedure is done, the cyclists' hands are free to lock his/her bicycle choosing from various locking scenarios, which are;

Scenario #1:

Lock just the frame in the chamber.

Locking Choices for Scenario #1:

Using a common household lock or u-shape lock, place the locks shackle within 19 the primary shackle cutout and lock, locking only the frame, or;

Using a u-shape lock place the u-shape lock around the front tire rim and place the u-shape lock shackle within 19, locking the frame within the chamber and the non-disconnected tire to the chamber, locking both frame and front tire.

Scenario #2: Remove the front tire and lock both frame and front tire in the chamber.

Locking Choices for Scenario #2:
Close the door and lock the chamber with a common household lock or u-shape or tether lock. Not locking the rear tire.

Scenario #3: Remove both front and back tires and lock the frame, and both tires within the chamber.

Locking Choices for Scenario #3:
Close the door and lock the chamber with a common household lock or u-shape or tether lock, locking all three within the chamber.

The secondary shackle cutout 15 can be used for differing locking choices. As an example: The cyclist could, if so desired, lock the frame within the invention using a common household lock placed with the primary shackle cutout 19 and then lock the front tire with a u-shape lock inserted through the secondary shackle cutout 15.

The hinge assembly 13 FIG. 1, and related members are configured including an encapsulated hinge pin 35, FIGS. 1 and 3 comprising hinge knuckles 37A, 37B that contain a fully bored hinge pin shaft 32, and partially bored knuckles 31A and 31B. The hinge pin cap and shoulder 34 and the hinge cap alignment pins 33 are inserted within the hinge pin alignment holes 36 and welded. Having knuckles 31A and 31B partially bored with the pin shaft 32 and 31A attached to the door 17, the encapsulated hinge pin design will deter vandals from removing the hinge pin, therefore deterring theft of items placed within the inventions' chamber 25.

Another consideration is how to place a tire, or tires containing spokes within the chamber and be placed atop the tire rim seat 29. To accomplish this, the spoke slip 28 sides are running downwards from the top of the tire rim seat 29 forming a narrowing width triangle or cone-shape configuration. Therefore, to be able to place a wheel containing spokes within the chamber, two adjacent spokes straddle the spoke slip and the tire rim is hung on the tire rim seat surface 29.

As the door 17, FIGS. 1 and 2 (sectional view) is swung closed and resting against the doorstop 22, the flange 18 and the associated primary flange cutout 19 passes through the doors' flange cutout 20, protruding outward, allowing for a lock shackle to be placed within 19, which therefore enables the contents within the chamber 25 to be secured by locking with a common household lock or specialty locks now connected on bicycle frames and transported by cyclists'.

Figure 4:
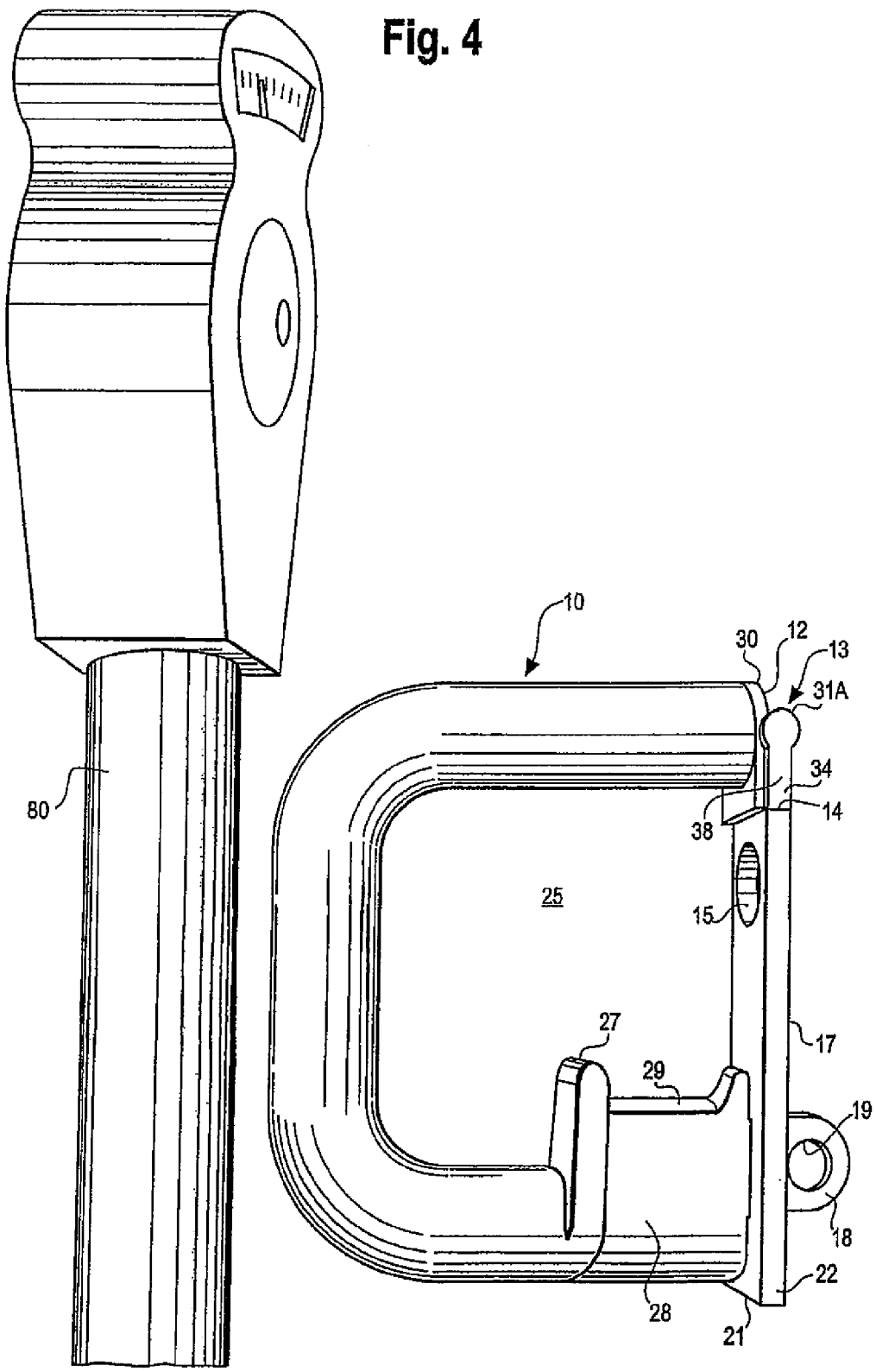
FIG. 4 is a side view of an embodiment of the assembled invention mounted to a fixture.

FIG. 4 illustrates the lock's hanger housing frame 10 a fixture 80. One of ordinary skill in the art would understand that the frame may be attached to the fixture in any number of ways known in the art. Fixture 80 is illustrated as a parking meter, but one of ordinary skill in the art would also understand that fixture 80 can also take variety of shapes, sizes, and forms.

CONCLUSION, RAMIFICATION AND SCOPE

Conclusion

The public and private use lockable bicycle rack hanger for frame and tires device that has been described within this patent application provides numerous features, advantages and benefits for the cyclist, municipality, pedestrian and even the bicycle manufacturers who understand the consumers concern when purchasing today's more costly bicycles, if they can't protect them while being locked in public, they won't buy them. The novel approach to solving parking and locking problems, will yield greater advantages than requiring a side rail for leaning a bicycle against, and eliminate the need to use u-shape or tether locks. Since these specialty locks are transported on bicycles already, they may be used to lock the present invention.

Ramifications and Scope

Further embodiments being contemplated, which are being planned include a means for municipalities to generate revenue. For example, an "Ad Header" which will be locked to the top of the hanger housing frame approximately 8"×10", will enable municipalities to sell ad space within a merchants community. An ad will be sold on a monthly basis for, as an example, $8.00 per ad per month, and the merchant has to purchase a minimum of ten locations where the invention is mounted. It is a way for the city to generate revenue to continue to provide funds to purchase and install additional bicycle racks.

A multi-station, and single stanchion design are being designed to accommodate schools, museums, corporations not necessarily concerned with sidewalk space so they too may benefit from the present inventions novel features. And for cities, corporations or other entities desiring more ornate stanchions to decorate their campus or sidewalks, several have been designed with hanging flower pots for sidewalk enhancement and beautification.

Although the invention is primarily intended to provide municipalities with a unique, novel, functional and useful bicycle locking rack to be attached to existing parking meters, light poles, signage poles and even existing prior art bicycle racks, the invention will also be made available as a stand alone embedded, surface and wall mounting model. Municipalities purchase the greatest number of bicycle rack being installed throughout the United States, but it should also be acknowledged that other entities such as, schools, universities, museums, corporations, libraries and the like, possibly not confronted with conserving sidewalk space, will also benefit from the novel and useful embodiments provided by the present invention by providing the various models that will be made available.

Although the present invention has been depicted using various geometric forms and materials, it should be recognized that the present invention might take many different forms and shapes. From all that has been said, it will be clear that there has been shown and described herein a lockable bicycle rack and hanger housing which fulfills the various objects and advantages sought therefore. It will become apparent to those skilled in the art, however, that many changes, modifications, variations and other uses and applications of the subject lockable bicycle rack are possible and contemplated. All changes, modifications, variations and other uses and applications which do not part from the spirit and scope of the invention are deemed to be covered by the invention, which are limited by the claims herein.

What is claimed is:
1. A lock for securing a bicycle comprising:
a frame having a first end and a second end wherein the frame is fastened to an existing non-movable object;
a hinge assembly movably connected to the frame first end;
a door portion having a first end and second end whereby the door portion first end is fixed to the hinge assembly and the door portion second end has an opening;
at least one seat for accepting a tire rim disposed on the frame second end; and a flange connected to the frame second end and having an opening whereby the flange is removably inserted into the door portion second end opening.

2. The lock of claim 1 wherein said seat is seat positioned on the frame adjacent the frame second end.

3. The bicycle lock of claim 1 wherein the hinge assembly is connected to an end cap that is mounted to the frame first end.

4. The lock of claim 1 wherein the hinge assembly is comprised of a hinge pin, a hinge pin cap, at least one hinge knuckle upper hinge leaf, at least one hinge knuckle lower hinge leaf.

5. The lock of claim 1 wherein the flange opening passes through the door portion second end opening and provides for substantially the entire flange opening to protrude past the door portion second end opening.

6. The lock of claim 1 further comprising a seat partition disposed adjacent the seat for accepting a tire rim.

7. The lock of claim 1 wherein the frame is substantially J-shaped.

8. The lock of claim 1 wherein the flange further comprises an attaching end cap that connects to the frame second end.

9. The lock of claim 1 further comprising a securing means that can be inserted into the flange opening, wherein the securing means is adapted to prevent the door portion from disengaging the flange.

10. A lock for securing a bicycle comprising:
   a frame having a first end with an opening and a second end with an opening;
   a flange having at a first end an end cap whereby the end cap is inserted into the frame second end opening and the flange having an opening at the second end;
   a hinge assembly having an end cap whereby the end cap is inserted into the frame first end opening; and
   a door assembly rotatably connected to the end cap at the first frame end and an opening is disposed at the door assembly second end whereby the opening accepts one end of the flange connected to the frame second end.

11. The lock of claim 10 further comprising a means for holding a bicycle frame disposed on the frame.

12. The lock of claim 11 wherein the means for holding a bicycle frame is a seat positioned on the frame adjacent the frame second end.

13. The bicycle lock of claim 10 wherein the hinge assembly is connected to the end cap.

14. The lock of claim 10 wherein the hinge assembly is comprised of a hinge pin, a hinge pin cap, at least one hinge knuckle upper hinge leaf, at least one hinge knuckle lower hinge leaf.

15. The lock of claim 10 wherein the flange opening passes through the door assembly second end opening and provides for substantially the entire flange opening to protrude past the door assembly second end opening.

16. The lock of claim 10 further comprising at least one seat for accepting a tire rim disposed on the frame second end.

17. The lock of claim 16 further comprising a seat partition disposed adjacent the seat for accepting a tire rim.

18. The lock of claim 10 wherein the frame is substantially J-shaped.

19. The lock of claim 10 wherein the frame is fastened to an existing non-movable object.

20. The lock of claim 10 wherein the flange end cap is attached to the frame second end.

21. The lock of claim 10 further comprising a securing means that can be inserted into the flange opening, wherein the securing means is adapted to prevent the door assembly from disengaging the flange.

22. The lock of claim 15 wherein the flange opening is adapted to receive a locking device.

* * * * *